US012566029B2

(12) United States Patent
Tsutsumi et al.

(10) Patent No.: US 12,566,029 B2
(45) Date of Patent: Mar. 3, 2026

(54) METHOD OF PRODUCING MOLTEN IRON USING ELECTRIC FURNACE INCLUDING VIDEO DEVICE

(71) Applicant: JFE STEEL CORPORATION, Tokyo (JP)

(72) Inventors: Koichi Tsutsumi, Tokyo (JP); Yoshihiro Miwa, Tokyo (JP); Shohei Nagashima, Tokyo (JP); Goro Okuyama, Tokyo (JP); Katsutoshi Endo, Tokyo (JP); Shunichi Kawanami, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 356 days.

(21) Appl. No.: 18/263,538

(22) PCT Filed: Jan. 27, 2022

(86) PCT No.: PCT/JP2022/003174
§ 371 (c)(1),
(2) Date: Jul. 31, 2023

(87) PCT Pub. No.: WO2022/172770
PCT Pub. Date: Aug. 18, 2022

(65) Prior Publication Data

US 2024/0085110 A1 Mar. 14, 2024

(30) Foreign Application Priority Data

Feb. 10, 2021 (JP) ................................ 2021-019718

(51) Int. Cl.
*C21B 11/10* (2006.01)
*C21B 13/12* (2006.01)
(Continued)

(52) U.S. Cl.
CPC ................ *F27B 3/28* (2013.01); *C21B 11/10* (2013.01); *C21B 13/12* (2013.01); *C21C 5/527* (2013.01);
(Continued)

(58) Field of Classification Search
CPC .... F27B 3/085; F27B 3/18; F27B 3/28; F27D 2019/0003; F27D 2019/0059;
(Continued)

(56) References Cited

U.S. PATENT DOCUMENTS 5,002,262 A 3/1991 Gocho et al.
5,611,838 A * 3/1997 Fritz ........................ C22B 7/02 75/10.38
(Continued)

FOREIGN PATENT DOCUMENTS

CN 102003875 A 4/2011
CN 207571060 U 7/2018
(Continued)

OTHER PUBLICATIONS

Computer-generated translation of JP2001074377A (2001-74377A) (Applicants: Nippon Kokan KK; Inventors: Mizukami Hideaki, Yamaguchi Ryuji, Nakayama Takeshi; Title: Method and facility for melting cold iron source), originally published on Mar. 23, 2001. (Year: 2001).*
(Continued)

*Primary Examiner* — Vanessa T. Luk
(74) *Attorney, Agent, or Firm* — KENJA IP LAW PC

(57) ABSTRACT

To ensure stable supply of a cold iron source to a melting chamber, a method of producing molten iron uses an electric furnace that includes: a preheating chamber; a melting chamber; an extruder located in the preheating chamber; and a video device configured to observe an inside of the melting chamber, and comprises: an extrusion process of supplying
(Continued)

a cold iron source preheated in the preheating chamber to the melting chamber by the extruder; and a melting process of melting the cold iron source supplied to the melting chamber by arc heat to obtain molten iron, wherein in the extrusion process, a moving amount of the extruder and/or a time interval for moving the extruder is controlled based on visual information obtained from the video device.

2 Claims, 2 Drawing Sheets

(51) Int. Cl.
*C21C 5/52* (2006.01)
*F27B 3/18* (2006.01)
*F27B 3/28* (2006.01)
*F27D 21/02* (2006.01)

(52) U.S. Cl.
CPC ................ *F27B 3/18* (2013.01); *F27D 21/02* (2013.01); *F27D 2021/026* (2013.01)

(58) Field of Classification Search
CPC ..... F27D 2019/0071; F27D 2019/0075; F27D 2019/0096; F27D 21/0028; F27D 21/0035; F27D 21/02; F27D 2021/0042; F27D 2021/026; C21B 11/10; C21B 13/12; C21B 13/125; C21C 5/4673; C21C 5/565; C21C 5/52
See application file for complete search history.

(56) References Cited

U.S. PATENT DOCUMENTS 5,883,918 A * 3/1999 Gubb ...................... F27B 19/02 373/79
6,004,504 A * 12/1999 Vallomy ............. F27D 21/0014 266/88
2012/0125152 A1 5/2012 Sato
2012/0152057 A1 6/2012 Mikami et al.

FOREIGN PATENT DOCUMENTS

| | | | |
|---|---|---|---|
| CN | 109517941 | A | 3/2019 |
| EP | 2461126 | B1 | 1/2018 |
| JP | H10292990 | A | 11/1998 |
| JP | H11281037 | A | 10/1999 |
| JP | 2001074377 | A | 3/2001 |
| JP | 2002121611 | A | 4/2002 |
| JP | 2004250724 | A | 9/2004 |
| JP | 2011069606 | A | 4/2011 |
| JP | 2012037157 | A | 2/2012 |
| JP | 2018070926 | A | 5/2018 |
| KR | 1019920007603 | B1 | 9/1992 |
| KR | 1020120035221 | A | 4/2012 |
| KR | 101397730 | B1 | 5/2014 |

OTHER PUBLICATIONS

Jul. 4, 2024, the Extended European Search Report issued by the European Patent Office in the corresponding European Patent Application No. 22752599.5.
Apr. 12, 2022, International Search Report issued in the International Patent Application No. PCT/JP2022/003174.
Guo Wanli et al., Alumina production process, vol. 2, Sep. 2006, pp. 622-623.
Mar. 25, 2025, Office Action issued by the China National Intellectual Property Administration in the corresponding Chinese Patent Application No. 202280013906.X with English language search report.
Nov. 20, 2024, Office Action issued by the Korean Intellectual Property Office in the corresponding Korean Patent Application No. 10-2023-7028148 with English language concise statement of relevance.

* cited by examiner

METHOD OF PRODUCING MOLTEN IRON USING ELECTRIC FURNACE INCLUDING VIDEO DEVICE

TECHNICAL FIELD

The present disclosure relates to a method of producing molten iron from a cold iron source using an electric furnace including a video device. The present disclosure particularly relates to a molten iron production method capable of observing the state of supply of a cold iron source from a preheating chamber to a melting chamber and, based on this visual information, controlling the conditions of supplying the cold iron source to the melting chamber.

BACKGROUND

In the production of molten iron using an electric furnace, a cold iron source such as scrap is melted by arc heat to obtain molten iron. There is thus the problem of consuming a large amount of electric power to generate arc heat. For example, the following methods are conventionally used to save the electric power consumption in the electric furnace: a method of preheating a cold iron source before melting by a burner using fossil fuel or the like; a method of preheating a cold iron source before melting using high-temperature exhaust gas generated during melting of a cold iron source in previous operation; and a method of blowing coke into a melting chamber as an auxiliary heat source.

For example, JP H10-292990 A (PTL 1) discloses a technique that, in an electric furnace in which a preheating shaft and a melting chamber are directly connected, while continuously or intermittently supplying a cold iron source to the preheating shaft so as to maintain the state in which the cold iron source is present in the melting chamber and the preheating shaft continuously, the cold iron source in the melting chamber is melted by arc. With the technique in PTL 1, the electric furnace that does not particularly require a device for conveying and supplying the cold iron source to the melting chamber is used to cause the cold iron source preheated by high-temperature exhaust gas to melt into molten iron, thus efficiently melting the cold iron source.

For example, JP 2018-70926 A (PTL 2) discloses an electric furnace operation control system including: an input unit that receives setting items as operating conditions for electrorefining; and a controller that feeds the setting items to a neural network to execute electric furnace refining based on operation result estimated values.

For example, JP 2011-69606 A (PTL 3) discloses a method of producing molten metal by melting an iron source using an arc melting line, including: a state change detection process of detecting a state change in a melting chamber when an arc discharge is generated; and a supply speed adjustment process of adjusting the speed of supplying the iron source to the melting chamber based on the detection result in the state change detection process.

CITATION LIST

Patent Literature

PTL 1: JP H10-292990 A
PTL 2: JP 2018-70926 A
PTL 3: JP 2011-69606 A

SUMMARY

Technical Problem

However, our examination revealed the following: Although the technique in PTL 1 is basically to continuously supply the cold iron source to the melting chamber while gradually melting the cold iron source by preheating and self-weight of the cold iron source, actually the supply of the cold iron source may stagnate in the path from the preheating shaft to the melting chamber. This is due to unintended situations, such as the cold iron source being excessively preheated and stuck in large lumps, or gaps forming in the column of the cold iron source. Since the state of the cold iron source in the melting chamber cannot be directly observed with the technique in PTL 1, it is impossible to recognize such unintended situations during operation. Such irregular supply of the cold iron source also increases the electric power consumption in the electric furnace.

The technique in PTL 2 is the electric furnace operation control system that constructs the neural network reflecting a state close to the electric furnace to enable accurate estimation of the end-point carbon concentration of molten steel tapped. However, video data used is data of the cold iron source photographed in a scrap charging device, i.e. the cold iron source before being charged into the electric furnace. Since the cold iron source differs in temperature between before and after being charged into the electric furnace and also how the cold iron source accumulates after being charged into the electric furnace varies, this technique is insufficient for stable supply of the cold iron source. Moreover, although this technique involves end-point carbon concentration and temperature control, it is insufficient for obtaining molten iron with high efficiency and low electric power consumption rate.

The technique in PTL 3 involves adjusting the speed of supplying the iron source to the melting chamber based on the result in the detection process, but does not concern the movement of the cold iron source in the electric furnace and is insufficient for stable supply of the cold iron source.

It could therefore be helpful to provide a molten iron production method that uses an electric furnace and can ensure stable supply of a cold iron source to a melting chamber and obtain molten iron with high efficiency and low electric power consumption rate.

Solution to Problem

Upon repeated examination, we discovered that stable supply of a cold iron source to a melting chamber can be ensured by providing, in an electric furnace, a device (extruder) for conveying and supplying the cold iron source to the melting chamber and a video device capable of observing the inside of the melting chamber, and immediately optimizing the operating conditions of the extruder based on the state inside the melting chamber obtained from the video device. We also discovered that such stable supply of the cold iron source can prevent operational troubles and effectively reduce the electric power consumption rate in production.

The present disclosure is based on these discoveries. We thus provide:

1. A method of producing molten iron using an electric furnace that includes a preheating chamber, and a melting chamber, wherein the electric furnace further includes an extruder located in the preheating chamber, and a video device configured to observe an inside of the melting chamber, and the method comprises: an extrusion process, performed in the preheating chamber, of supplying a cold iron source preheated in the preheating chamber to the melting chamber by the extruder; and a melting process, performed in the melting chamber, of melting the cold iron source supplied to the melting chamber by arc heat to obtain molten iron, wherein in the extrusion process, one or both of a moving amount of the extruder and a time interval for moving the extruder are controlled based on visual information obtained from the video device.

In the present disclosure, the "moving amount of the extruder" means the moving distance of the extruder in the extrusion direction when the extruder moves from the preheating chamber side to the melting chamber side once (i.e. in one cycle). The "time interval for moving the extruder" means the interval from the time ($T0_{START}$) at which the movement of the extruder starts in one cycle to the time ($T1_{START}$) at which the movement of the extruder starts in the next cycle (see FIGS. 2A and 2B).

2. The method of producing molten iron according to 1., wherein in the extrusion process, one or both of increasing the moving amount and reducing the time interval are performed in the case where the visual information obtained from the video device indicates that the cold iron source is not supplied from the preheating chamber to the melting chamber.

3. The method of producing molten iron according to 1. or 2., wherein in the extrusion process, further, one or both of increasing the moving amount and reducing the time interval are performed in the case where an extrusion pressure of the extruder is 40 MPa or less.

Advantageous Effect

It is thus possible to stably and reliably supply a cold iron source to a melting chamber in an electric furnace. This has industrially significant effects such as enhancing the melting efficiency of the cold iron source, effectively reducing the electric power consumption rate, and preventing operational troubles.

DETAILED DESCRIPTION

Figure 1:
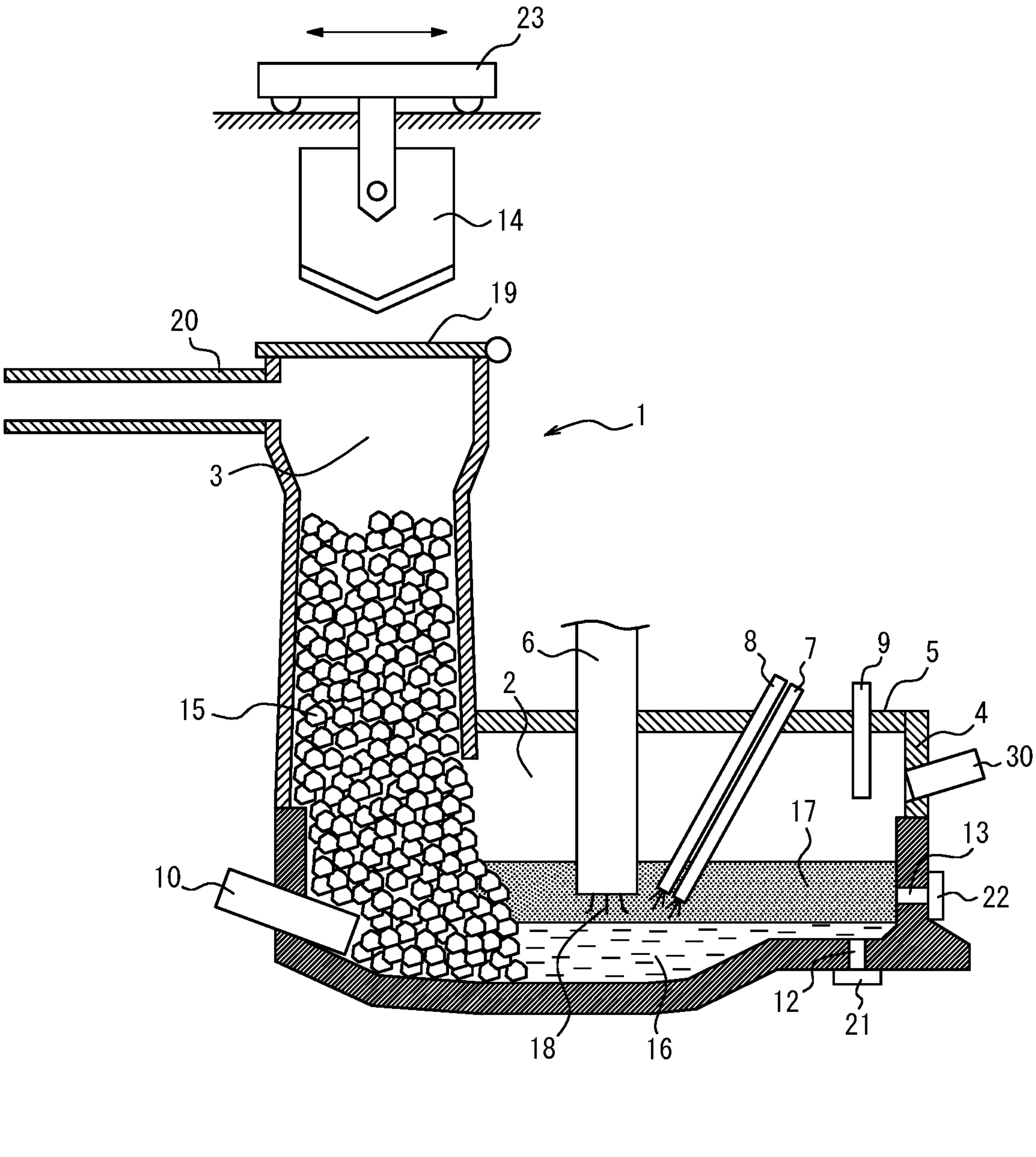
FIG. 1 is a longitudinal sectional view of an electric furnace including a video device used in an embodiment of the present disclosure.
Figure 2B:
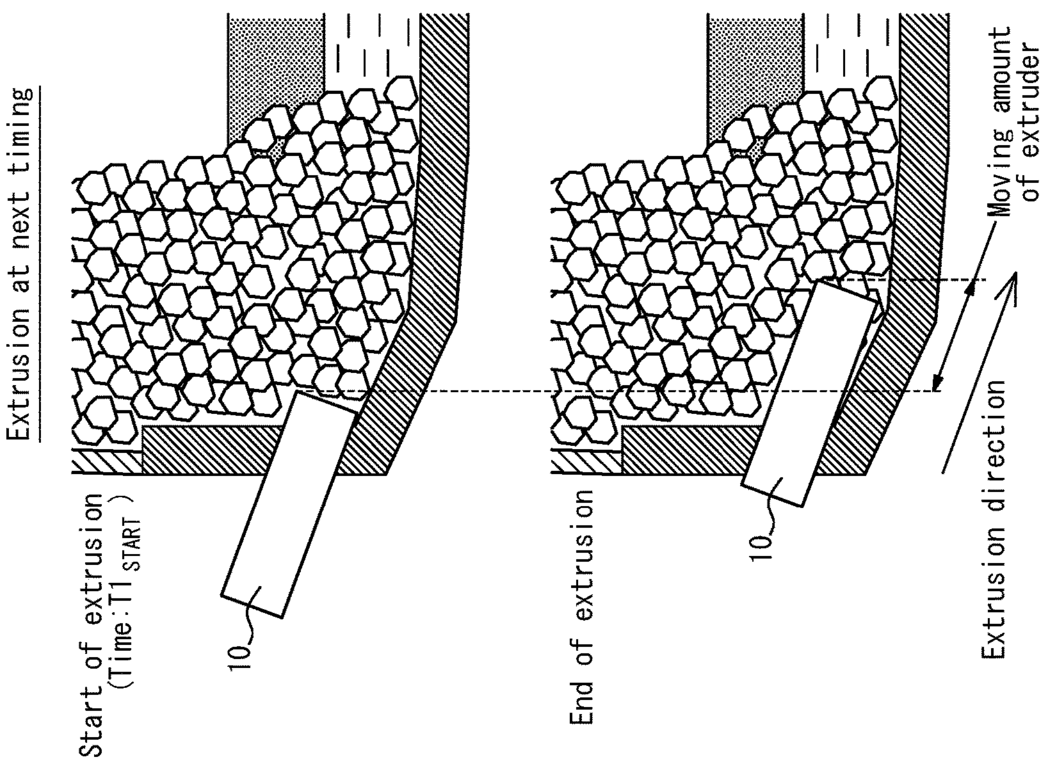
FIG. 2B is a conceptual diagram for explaining the moving amount of the extruder and the time interval for moving the extruder, and illustrating the extrusion behavior at the next timing following the one timing.
Figure 2A:
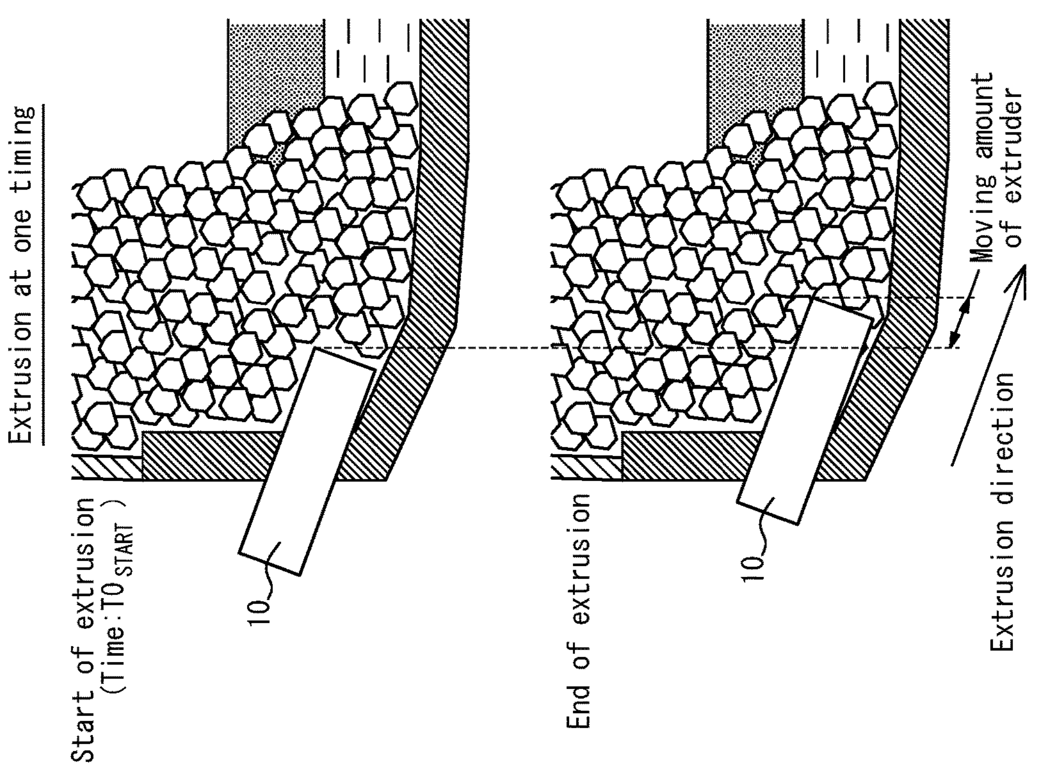
FIG. 2A is a conceptual diagram for explaining the moving amount of an extruder and the time interval for moving the extruder, and illustrating the extrusion behavior at one timing.

An embodiment of the present disclosure will be described in detail below.

The embodiment described below shows a preferred example of the present disclosure, and the present disclosure is not limited to such example.

(Molten Iron Production Method)

A molten iron production method according to the present disclosure is a method using an electric furnace having a predetermined structure, and includes: an extrusion process of supplying a cold iron source preheated in a preheating chamber to a melting chamber by an extruder; and a melting process of melting the cold iron source supplied to the melting chamber by arc heat to obtain molten iron. The molten iron production method may optionally further include other processes. In the extrusion process according to the present disclosure, the operating conditions of the extruder are controlled based on visual information obtained from a video device configured to observe the inside of the melting chamber.

By appropriately and timely controlling the operating conditions of the extruder based on the visual information of the inside of the melting chamber, it is possible to stably and reliably supply the cold iron source to the melting chamber and effectively reduce the electric power consumption in the electric furnace.

[Electric Furnace]

The electric furnace that can be suitably used in the present disclosure will be described in detail below, with reference to the drawings.

An electric furnace 1 includes: a melting chamber 2 for melting a cold iron source 15 by heat from an arc 18 to obtain molten iron 16; a preheating chamber 3 for preheating the cold iron source 15 and supplying the preheated cold iron source 15 to the melting chamber 2 by an extruder 10; and a video device 30 installed at a given position.

The cold iron source 15 as raw material is charged into a supply bucket 14 and transported to above a desired cold iron source supply port 19 by a traveling carriage 23. The cold iron source supply port 19 is then opened to supply the cold iron source 15 to the preheating chamber 3 from above.

The cold iron source 15 supplied to the preheating chamber 3 is preheated by any method. For example, hot exhaust gas previously generated in the melting chamber 2 may be passed into the preheating chamber 3 to preheat the cold iron source 15, with it being possible to enhance the production efficiency. Exhaust gas may be sucked through a duct 20 and passed into the preheating chamber 3, and excess exhaust gas may be exhausted through the duct 20.

The preheated cold iron source 15 is continuously supplied to the melting chamber 2 by the extruder 10. The extruder 10 repeatedly moves its tip toward the melting chamber to thus keep pushing out the cold iron source 15 in the preheating chamber 3 to the melting chamber. The supply amount and supply timing of the cold iron source 15 to the melting chamber 2 by the extruder 10 are typically adjustable based on the moving amount of the extruder 10 and the time interval for moving the extruder 10. Increasing the moving amount of the extruder 10 or shortening the time interval for moving the extruder 10 facilitates the supply of the cold iron source 15. Usually, the moving amount and the time interval are initially set to certain values and then automatic operation is performed from the viewpoint of operational efficiency. In the present disclosure, however, it is important to recognize the state of supply of the cold iron source 15 to the melting chamber 2 on the spot and immediately control the operating conditions of the extruder 10 based on the recognition result, as described in detail later.

The extruder 10 typically has a cylinder structure.

The melting chamber 2 is defined by a furnace wall 4 and a furnace lid 5, and typically includes an electrode 6 for generating an arc 18 for heating, an oxygen blowing lance 7 for maintaining a desired high-temperature state, a carbon material blowing lance 8, and a burner 9 for locally heating low-temperature parts. The cold iron source 15 supplied to the melting chamber 2 is melted by arc heat into molten iron 16 and molten slag 17. The obtained molten iron 16 can be tapped from a tapping hole 12 by opening a tapping door 21. The molten slag 17 can be discharged from a slag hole 13 by opening a slag discharge door 22.

Typical examples of the cold iron source 15 include in-house scrap generated at steelworks, consumer scrap, and pig iron made by hardening hot metal, without being limited thereto. Examples of in-house scrap generated at steelworks include unsteady parts (parts at the start of casting and parts generated at the end of casting) of cast steel generated by continuous casting or ingot casting, and crops generated in rolling of steel materials such as steel strips. Examples of consumer scrap include recycled materials such as construction steel materials (H-beam, etc.), automobile steel materials, and cans. Examples of pig iron made by hardening hot metal include pig iron generated by tapping and hardening hot metal obtained from iron ore, coke, etc. as raw materials in a smelting furnace such as a blast furnace.

The video device 30 is not limited as long as it is capable of capturing an image of an observation object. The video device 30 typically includes a lens and a camera. It is preferable to flow cooling gas at any flow rate around the lens (not illustrated) installed at the tip of the video device 30. Appropriately cooling the video device 30 allows the video device 30 to withstand the high temperature inside the electric furnace, and prevents narrowing of the field of view when slag or molten steel scatters. Examples of the cooling gas include air and inert gas such as nitrogen. For example, in the case where the video device 30 is installed at the furnace wall 4, it is preferable to also cool the furnace wall 4 by water cooling or air cooling.

The video device 30 is preferably installed at the furnace wall 4 or the furnace lid 5 defining the melting chamber 2 and more preferably installed at the furnace wall 4, from the viewpoint of better recognition of the behavior of the cold iron source 15 being extruded from the preheating chamber 3 into the melting chamber 2. From the same viewpoint, the video device 30 is preferably installed at an appropriate height where slag and molten steel are less likely to scatter in the melting chamber 2. Although the installation method is not limited, in the case of installing the video device 30 at the furnace wall 4, it is preferable to attach the video device 30 through a hole (not illustrated) formed in the furnace wall 4. In this way, the camera can be located outside the electric furnace 1 while the lens is located inside the melting chamber 2 and thus both a clear visual field and simple operability can be achieved. Images captured by the video device 30 are typically connected to a monitor and/or a recording device (both not illustrated) in an operation room operated by an operator via a cable (not illustrated).

[Extrusion Process]

In the extrusion process in the present disclosure, the cold iron source 15 preheated in the preheating chamber 3 is extruded and supplied to the melting chamber 2 by the extruder 10 located in the preheating chamber 3. The supply amount and supply timing of the cold iron source 15 in one extrusion depend on the moving amount of the extruder 10 and the time interval for moving the extruder 10. In usual operation, there are a plurality of setting patterns for the moving amount and the time interval according to the type of cold iron source and the preheating state, and automatic operation is performed using a suitable setting pattern. In the present disclosure, such control can be performed that continues automatic operation without changing the setting pattern of the moving amount and/or the time interval while it is determined, based on visual information obtained from the video device 30, that the cold iron source 15 is properly supplied into the melting chamber 2.

The supply of the cold iron source 15 may, however, stagnate for some reason, as mentioned above. Specifically, the visual information from the video device 30 may reveal, for example, that the movement of the cold iron source 15 entering the melting chamber 2 is sluggish and intermittent, or completely stops, or the interface of the molten iron 16 in the melting chamber 2 is below the desired position. In such a case where it is determined from the video device 30 that the cold iron source 15 is not supplied from the preheating chamber 3 to the melting chamber 2, the setting pattern of the moving amount and/or time interval of the extruder 10 can be changed immediately. In the case of setting the moving amount and/or time interval to different values, automatic operation is temporarily switched to manual setting and, once good supply of the cold iron source 15 has been recognized again, automatic operation is resumed using the normal setting pattern.

Moving Amount

One of the features according to the present disclosure is to control whether to change the moving amount of the extruder 10 based on the visual information obtained from the video device 30. In particular, in the case where it is determined from the video device 30 that the cold iron source 15 is not properly supplied, it is preferable to increase the moving amount to push out the extruder 10 over a longer distance and thus promote smooth movement of the cold iron source 15. For example, the moving amount of the extruder 10 may be increased by about 10% in order to intentionally move 1 ton of the cold iron source 15.

The changed moving amount is used until the cold iron source 15 is properly supplied again. The moving amount of the extruder 10 can be constantly monitored by a position sensor.

Time Interval

Another feature according to the present disclosure is to control whether to change the time interval for moving the extruder 10 based on the visual information obtained from the video device 30. In particular, in the case where it is determined from the video device 30 that the cold iron source 15 is not properly supplied, it is preferable to reduce the time interval to push out the extruder 10 more times within a certain time period and thus promote smooth movement of the cold iron source 15. For example, the time interval for moving the extruder 10 may be shortened by about 20% in order to intentionally move 1 ton of the cold iron source 15.

The changed time interval is used until the cold iron source 15 is properly supplied again. The time interval of the extruder 10 can be constantly monitored by a timer and a position sensor.

Pressure

The pressure exerted on the extruder 10 can be constantly measured. Upon further examination, we found out that the visual information from the video device 30 and the extrusion pressure when the extruder 10 moves toward the melting chamber 2 correlate with each other. In detail, we newly learned that the extrusion pressure of the extruder 10 is 40 MPa or less in the case where the visual information from the video device 30 indicates that the cold iron source 15 is not properly supplied, specifically, the movement of the cold iron source 15 is completely stopped or is sluggish until the next extrusion timing.

The visual information from the video device 30 is mainly information about the surface of the cold iron source 15 present so as to be within the field of view of the video device 30. Therefore, for example, it is difficult to, by the video device 30, recognize the state of the cold iron source 15 present inside the column of the cold iron source 15 deeper than the surface, and determine whether the entire depth of the column of the cold iron source 15 is moving. Using the extrusion pressure exerted on the extruder 10 as an index in addition to the visual information from the video device 30 makes it possible to more accurately control the proper supply of the cold iron source 15 to the melting chamber 2. In detail, it is preferable to increase the moving amount of the extruder 10 and/or reduce the time interval for moving the extruder 10 as mentioned above in the case where the cold iron source 15 is not properly supplied according to the visual information from the video device 30 and also the extrusion pressure of the extruder 10 is 40 MPa or less.

[Melting Process]

In the melting process in the present disclosure, the preheated cold iron source 15 supplied to the melting chamber 2 is melted by arc heat to obtain molten iron in the melting chamber 2. The specific melting method is as described above with regard to the electric furnace. In the present disclosure, the operating conditions of the extruder 10 are timely controlled during operation so as to smoothly supply the cold iron source 15 from the preheating chamber 3 to the melting chamber 2 while observing the inside of the melting chamber 2 using the video device 30, so that the electric power consumption required in the melting process can be reduced.

[Other Processes]

The other processes include, for example, a preheating process and a tapping process.

In the preheating process before the extrusion process, the cold iron source 15 can be preheated by any heating method to enhance the efficiency of the subsequent melting process. Moreover, using, for the preheating process, high-temperature exhaust gas previously generated in the melting chamber 2 can reduce the electric power consumption required for the preheating process, as mentioned above.

In the tapping process after the melting process, the molten iron 16 accumulated in the melting chamber 2 can be taken out of the electric furnace 1 through the tapping hole 12.

EXAMPLES

The presently disclosed techniques will be described in detail below by way of examples. The following examples are merely preferred examples according to the present disclosure, and the present disclosure is not limited to the following examples. Modifications can be made to the following examples within the range in which the subject matter of the present disclosure is applicable, with all such modifications being also included in the technical scope of the present disclosure.

In an electric furnace including the melting chamber 2, the preheating chamber 3, the extruder 10, and the video device 30 installed in the melting chamber 2 illustrated in FIG. 1, a cold iron source was melted to produce molten iron under the extrusion conditions shown in Table 1. Of the extrusion conditions shown in Table 1, the moving amount and the time interval are artificially set value, and the pressure is the value of pressure exerted on the extruder 10 as a result of extrusion with the set moving amount and time interval. The line specifications of this electric furnace are as follows:

Molten iron capacity of melting chamber: 130 tons.

Electric power: AC 50 Hz.

Transformer capacity: 75 MVA.

Number of electrodes: 3.

The video device 30 was installed through a hole formed in the furnace wall 4 at a position 500 mm higher than the designed molten iron interface in the case of obtaining 130 tons of molten iron. As cooling air, air prepared in the factory was flown at a flow rate of 200 NL/min along the outer surface of the video device 30. A dryer system by heating was used for drying the air. Visual information (images or video) from the video device 30 was stored in a separate recording medium through a cable extended to a command room and electric control room for operating the electric furnace 1. A monitor was newly prepared in the command room so that the operator operating the electric furnace 1 can directly monitor the image from the video device 30. Data on the moving amount of the extruder 10, the time interval for moving the extruder 10, and the extrusion pressure was transferred to the electric control room so that these data and the image information could be checked simultaneously.

Conventional Example 1

Conventional Example 1 is an example of operation within the range of normal electric power consumption rate in the production method not using the video device.

The moving amount of one cycle set for the extruder (cylinder) at one timing was 1000 mm, and the time interval of movement was 20 seconds. The pressure exerted on the cylinder when the cylinder was pushed out under these conditions was 58 MPa.

Subsequently, when the cylinder was pushed out with a moving amount of 1000 mm after 20 seconds without changing the moving amount and time interval of the cylinder at the next timing, the pressure exerted on the cylinder was 64 MPa. Thus, molten iron for one charge was obtained without changing the extrusion conditions.

In Conventional Example 1, although the supply state of the cold iron source could not be recognized without the video device, it was assumed from the operator's experience that a constant amount of the cold iron source was supplied to the melting chamber at regular intervals as expected. Consequently, the electric power consumption rate per charge was 333 kWh/t in the operation of the electric furnace.

Conventional Example 2

Conventional Example 2 is an example in which the electric power consumption rate was higher than normal in the production method not using the video device.

The moving amount of one cycle set for the cylinder at one timing was 1000 mm, and the time interval of movement was 20 seconds. The pressure exerted on the cylinder when the cylinder was pushed out under these conditions was 33 MPa, which was lower than that in Conventional Example 1.

The reason why the pressure was lower than normal was unclear without the video device. Subsequently, when the cylinder was pushed out with a moving amount of 1000 mm after 20 seconds without changing the moving amount and time interval of the cylinder at the next timing, the pressure exerted on the cylinder remained low at 31 MPa. Thus, molten iron for one charge was obtained without changing the extrusion conditions. The melting time required to obtain molten iron for one charge was longer than the time expected by design.

In Conventional Example 2, although the supply state of the cold iron source could not be recognized without the video device, it was assumed that the cold iron source was not supplied to the melting chamber as expected for some reason and the cold iron source could not be melted efficiently. Consequently, the electric power consumption rate per charge was 362 kWh/t, which was worse than that in Conventional Example 1.

Comparative Example

Comparative Example is an example in which, in the production method using the video device, the extrusion conditions were not controlled based on visual information obtained from the video device.

The moving amount of one cycle set for the cylinder at one timing was 1000 mm, and the time interval of movement was 20 seconds. The pressure exerted on the cylinder when the cylinder was pushed out under these conditions was 34 MPa, which was lower than that in Conventional Example 1. In fact, the visual information obtained from the video device revealed that the cold iron source stagnated without moving to the melting chamber.

Despite the recognition from the video device that the cold iron source was not properly supplied to the melting chamber, subsequently the cylinder was pushed out with a moving amount of 1000 mm after 20 seconds without changing the moving amount and time interval of the cylinder at the next timing. The pressure exerted on the cylinder as a result remained low at 34 MPa. In fact, the visual information obtained from the video device revealed that the cold iron source still stagnated without moving to the melting chamber. Thus, molten iron for one charge was obtained without changing the extrusion conditions. The melting time required to obtain molten iron for one charge was longer than the time expected by design. Consequently, the electric power consumption rate per charge was 347 kWh/t, which was worse than that in Conventional Example 1. The overall evaluation was therefore x (fail).

Examples 1 to 6 are examples in which, in the production method using the video device, the extrusion conditions were controlled based on visual information obtained from the video device.

Example 1

The moving amount of one cycle set for the cylinder at one timing was 1000 mm, and the time interval of movement was 20 seconds. The pressure exerted on the cylinder when the cylinder was pushed out under these conditions was 30 MPa, which was lower than that in Conventional Example 1. In fact, the visual information obtained from the video device revealed that the cold iron source stagnated without moving to the melting chamber.

Accordingly, the time interval for moving the cylinder at the next timing was shortened to 5 seconds. A setting pattern of the time interval shortened to 5 seconds and the moving amount of the cylinder in one cycle kept at 1000 mm was repeated several times until it was recognized from the video device that the cold iron source started to be properly supplied. The pressure exerted on the cylinder in the cycle where it was determined that the cold iron source started to be properly supplied was recovered to 58 MPa. After this, the time interval was set back to 20 seconds. However, since similar stagnation of the cold iron source was then recognized (where the cylinder pressure was 40 MPa or less), the time interval was temporarily changed to 5 seconds as above. While repeating this operation, molten iron for one charge was obtained. Consequently, the electric power consumption rate per charge was 327 kWh/t, which was better than that in Conventional Example 1. The overall evaluation was therefore ○ (pass).

Example 2

The moving amount of one cycle set for the cylinder at one timing was 1000 mm, and the time interval of movement was 20 seconds. The pressure exerted on the cylinder when the cylinder was pushed out under these conditions was 34 MPa, which was lower than that in Conventional Example 1. In fact, the visual information obtained from the video device revealed that the cold iron source stagnated without moving to the melting chamber.

Accordingly, the moving amount of the cylinder at the next timing was increased to 1200 mm. A setting pattern of the moving amount increased to 1200 mm and the time interval for moving the cylinder kept at 20 seconds was repeated several times until it was recognized from the video device that the cold iron source started to be properly supplied. The pressure exerted on the cylinder in the cycle where it was determined that the cold iron source started to be properly supplied was recovered to 62 MPa. After this, the moving amount was set back to 1000 mm. However, since similar stagnation of the cold iron source was then recognized (where the cylinder pressure was 40 MPa or less), the moving amount was temporarily changed to 1200 mm as above. While repeating this operation, molten iron for one charge was obtained. Consequently, the electric power consumption rate per charge was 329 kWh/t, which was better than that in Conventional Example 1. The overall evaluation was therefore ○ (pass).

Example 3

The moving amount of one cycle set for the cylinder at one timing was 1000 mm, and the time interval of movement was 20 seconds. The pressure exerted on the cylinder when the cylinder was pushed out under these conditions was 31 MPa, which was lower than that in Conventional Example 1. In fact, the visual information obtained from the video device revealed that the cold iron source stagnated without moving to the melting chamber.

Accordingly, the time interval for moving the cylinder at the next timing was shortened to 5 seconds, and also the moving amount of the cylinder at the next timing was increased to 1200 mm. This setting pattern was repeated several times until it was recognized from the video device that the cold iron source started to be properly supplied. The pressure exerted on the cylinder in the cycle where it was determined that the cold iron source started to be properly supplied was recovered to 67 MPa. After this, the time interval was set back to 20 seconds and the moving amount was set back to 1000 mm. However, since similar stagnation of the cold iron source was then recognized (where the cylinder pressure was 40 MPa or less), the time interval and the moving amount were temporarily changed to 5 seconds and 1200 mm respectively as above. While repeating this operation, molten iron for one charge was obtained. Consequently, the electric power consumption rate per charge was 326 kWh/t, which was better than that in Conventional Example 1. The overall evaluation was therefore ○ (pass).

Example 4

The moving amount of one cycle set for the cylinder at one timing was 1000 mm, and the time interval of movement was 20 seconds. The pressure exerted on the cylinder when the cylinder was pushed out under these conditions was 32 MPa, which was lower than that in Conventional Example 1. In fact, the visual information obtained from the video device revealed that, although the cold iron source was moving to the melting chamber, the movement was sluggish.

Accordingly, the moving amount of the cylinder at the next timing was increased to 1200 mm. A setting pattern of the moving amount increased to 1200 mm and the time interval for moving the cylinder kept at 20 seconds was repeated several times until it was recognized from the video device that the cold iron source started to be properly supplied. The pressure exerted on the cylinder in the cycle where it was determined that the cold iron source started to be properly supplied was recovered to 66 MPa. After this, the moving amount was set back to 1000 mm. However, since a similar phenomenon that the movement of the cold iron source was sluggish was then recognized (where the cylinder pressure was 40 MPa or less), the moving amount was temporarily changed to 1200 mm as above. While repeating this operation, molten iron for one charge was obtained. Consequently, the electric power consumption rate per charge was 319 kWh/t, which was better than that in Conventional Example 1. The overall evaluation was therefore ○ (pass).

Example 5

The moving amount of one cycle set for the cylinder at one timing was 1000 mm, and the time interval of movement was 20 seconds. The pressure exerted on the cylinder when the cylinder was pushed out under these conditions was 35 MPa, which was lower than that in Conventional Example 1. In fact, the visual information obtained from the video device revealed that, although the cold iron source was moving to the melting chamber, the movement was sluggish.

Accordingly, the time interval for moving the cylinder at the next timing was shortened to 5 seconds, and also the moving amount of the cylinder at the next timing was increased to 1200 mm. This setting pattern was repeated several times until it was recognized from the video device that the cold iron source started to be properly supplied. The pressure exerted on the cylinder in the cycle where it was determined that the cold iron source started to be properly supplied was recovered to 71 MPa. After this, the time interval was set back to 20 seconds and the moving amount was set back to 1000 mm. However, since a similar phenomenon that the movement of the cold iron source was sluggish was then recognized (where the cylinder pressure was 40 MPa or less), the time interval and the moving amount were temporarily changed to 5 seconds and 1200 mm respectively as above. While repeating this operation, molten iron for one charge was obtained. Consequently, the electric power consumption rate per charge was 315 kWh/t, which was better than that in Conventional Example 1. The overall evaluation was therefore ○ (pass).

Example 6

The moving amount of one cycle set for the cylinder at one timing was 1000 mm, and the time interval of movement was 20 seconds. The pressure exerted on the cylinder when the cylinder was pushed out under these conditions was 30 MPa, which was lower than that in Conventional Example 1. In fact, the visual information obtained from the video device revealed that, although the cold iron source was moving to the melting chamber, the movement was sluggish.

Accordingly, the time interval for moving the cylinder at the next timing was shortened to 5 seconds. A setting pattern of the time interval shortened to 5 seconds and the moving amount of the cylinder in one cycle kept at 1000 mm was repeated several times until it was recognized from the video device that the cold iron source started to be properly supplied. The pressure exerted on the cylinder in the cycle where it was determined that the cold iron source started to be properly supplied was recovered to 69 MPa. After this, the time interval was set back to 20 seconds. However, since a similar phenomenon that the movement of the cold iron source was sluggish was then recognized (where the cylinder pressure was 40 MPa or less), the time interval was temporarily changed to 5 seconds as above. While repeating this operation, molten iron for one charge was obtained. Consequently, the electric power consumption rate per charge was 318 kWh/t, which was better than that in Conventional Example 1. The overall evaluation was therefore ○ (pass).

TABLE 1

| | Extrusion behavior at one timing | | | | Extrusion behavior at next timing |
|---|---|---|---|---|---|
| | Extrusion conditions | | | | Extrusion conditions |
| | Moving amount (mm) | Time interval (sec) | Pressure (MPa) | Visual information obtained from video device (Whether cold iron source was moving) | Moving amount (mm) |
| Conventional Example 1 | 1000 | 20 | 58 | No video device | 1000 |
| Conventional Example 2 | 1000 | 20 | 33 | No video device | 1000 |
| Comparative Example | 1000 | 20 | 34 | Not moving (Stagnation of cold iron source recognized) | 1000 |
| Example 1 | 1000 | 20 | 30 | Not moving (Stagnation of cold iron source recognized) | 1000 |
| Example 2 | 1000 | 20 | 34 | Not moving (Stagnation of cold iron source recognized) | 1200 |
| Example 3 | 1000 | 20 | 31 | Not moving (Stagnation of cold iron source recognized) | 1200 |
| Example 4 | 1000 | 20 | 32 | Moving (Sluggish movement of cold iron source recognized) | 1200 |

TABLE 1-continued

| | | | | | |
|---|---|---|---|---|---|
| Example 5 | 1000 | 20 | 35 | Moving (Sluggish movement of cold iron source recognized) | 1200 |
| Example 6 | 1000 | 20 | 30 | Moving (Sluggish movement of cold iron source recognized) | 1000 |

| | Extrusion behavior at next timing | | | | |
|---|---|---|---|---|---|
| | Extrusion conditions | | | Electric power | |
| | Time interval (sec) | Pressure (MPa) | Visual information obtained from video device (Whether cold iron source was moving) | consumption rate per charge (kWh/t) | Overall evaluation |
| Conventional Example 1 | 20 | 64 | No video device | 333 | Expected movement |
| Conventional Example 2 | 20 | 31 | No video device | 362 | Melting effciency lower than expected |
| Comparative Example | 20 | 34 | Not moving (Stagnation of cold iron source recognized) | 347 | x |
| Example 1 | 5 | 58* | Moving | 327 | ○ |
| Example 2 | 20 | 62* | Moving | 329 | ○ |
| Example 3 | 5 | 67* | Moving | 326 | ○ |
| Example 4 | 20 | 66* | Moving | 319 | ○ |
| Example 5 | 5 | 71* | Moving | 315 | ○ |
| Example 6 | 5 | 69* | Moving | 318 | ○ |

*Value at timing when it was determined that cold iron source started to be properly supplied.

As is clear from Table 1, as a result of operating the electric furnace while timely controlling the extrusion conditions of the extruder based on the visual information of the inside of the melting chamber obtained from the video device, the cold iron source continued to be well supplied to the melting chamber even when an unexpected situation occurred for the supply of the cold iron source, and molten iron was obtained with high efficiency. This had significant effects as the electric power consumption rate, which accounts for a large part of the production costs, was greatly reduced.

INDUSTRIAL APPLICABILITY

It is thus possible to stably and reliably supply a cold iron source to a melting chamber in an electric furnace and enhance the melting efficiency of the cold iron source.

REFERENCE SIGNS LIST

1 electric furnace
2 melting chamber
3 preheating chamber
4 furnace wall
5 furnace lid
6 electrode
7 oxygen blowing lance
8 carbon material blowing lance
9 burner
10 extruder
12 tapping hole
13 slag hole
14 supply bucket
15 cold iron source
16 molten iron
17 molten slag
18 arc
19 cold iron source supply port
20 duct
21 tapping door
22 slag discharge door
23 traveling carriage
30 video device

The invention claimed is:

1. A method of producing molten iron using an electric furnace that includes a preheating chamber, and a melting chamber, wherein the electric furnace further includes an extruder located in the preheating chamber, and a video device configured to observe an inside of the melting chamber, and the method comprises:

an extrusion process, performed in the preheating chamber, of supplying a cold iron source preheated in the preheating chamber to the melting chamber by the extruder; and a melting process, performed in the melting chamber, of melting the cold iron source supplied to the melting chamber by arc heat to obtain molten iron, wherein in the extrusion process, one or both of a moving amount of the extruder and a time interval for moving the extruder are controlled based on visual information obtained from the video device, and wherein in the extrusion process, further, one or both of increasing the moving amount and reducing the time interval are performed in the case where an extrusion pressure of the extruder is 40 MPa or less.

2. The method of producing molten iron according to claim 1, wherein in the extrusion process, one or both of increasing the moving amount and reducing the time interval are performed in the case where the visual information obtained from the video device indicates that the cold iron source is not supplied from the preheating chamber to the melting chamber.

* * * * *